United States Patent [19]
Johnston

[11] Patent Number: 5,823,589
[45] Date of Patent: Oct. 20, 1998

[54] ACCESSORY FOR CHARCOAL GRILL

[76] Inventor: Brad Johnston, 4027 Brandywine St. NW., Washington, D.C. 20016

[21] Appl. No.: 463,845

[22] Filed: Jun. 5, 1995

[51] Int. Cl.[6] .................................................... A47J 43/28
[52] U.S. Cl. .................................................. 294/7; 99/394
[58] Field of Search ............................ 294/7, 8, 32, 49, 294/55.5, 59; 30/322, 323; 99/394, 402, 419, 421 A; D7/653, 688, 690

[56] References Cited

U.S. PATENT DOCUMENTS

| | | | |
|---|---|---|---|
| D. 25,394 | 4/1896 | Upton | D7/690 X |
| 110,589 | 12/1870 | Read et al. | 99/402 |
| D. 198,097 | 4/1964 | Foster | 294/7 X |
| D. 218,190 | 7/1970 | Demetreon | 294/32 X |
| D. 264,037 | 4/1982 | Johnson | D7/690 X |
| 431,550 | 7/1890 | Brooks | 99/402 |
| 2,148,879 | 2/1939 | Rossini et al. | 99/402 |
| 2,697,627 | 12/1954 | La Fond | 294/32 |

FOREIGN PATENT DOCUMENTS

| | | | |
|---|---|---|---|
| 132154 | 4/1949 | Australia | 294/7 |
| 132544 | 5/1949 | Australia | 294/32 |
| 2592573 | 7/1987 | France | 294/32 |

*Primary Examiner*—Johnny D. Cherry

[57] ABSTRACT

A food-handling device for grillers which utilizes a unique pivoting structure to rotate a tined array about a center axis allowing relatively fragile food items such as fish to be turned over and removed from the grill surface without sticking or breaking apart.

5 Claims, 2 Drawing Sheets

ACCESSORY FOR CHARCOAL GRILL

FIELD OF THE INVENTION

The invention relates in general to culinary implements, particularly to food-handling devices such as those used in conjunction with cooking grills.

BACKGROUND OF THE INVENTION

Implements for lifting and turning foods on a tray or grill are well known and documented, and a patent search in Classes 30, 294 and Design Class 7 revealed the following patents which are directed to the subject matter of the present invention:

U.S. Pat. No. 512,162 - Kuddy, 1894
U.S. Pat. No. 1,313,417 - Raymond, 1919
U.S. Pat. No. 1,604,050 - Jennings, 1926
U.S. Pat. No. 2,110,640 - Aldrich, 1938
U.S. Pat. No. 2,697,627 - Fond, 1954
U.S. Pat. No. 2,747,911 - Kuever, 1956
U.S. Pat. No. 3,213,779 - First, 1965
U.S. Pat. No. 4,848,816 - Anderson, 1989
U.S. Pat. No. D.29,621 - Pitts, 1898
U.S. Pat. No. D.198,097 - Foster, 1964
U.S. Pat. No. D.218,190 - Demetreon, 1970
U.S. Pat. No. D.224,037 - Demetreon, 1972

The implements of the above patents fail to incorporate structure to facilitate the turning of the food from one side to another.

SUMMARY OF THE INVENTION

The present invention is comprised of a hand-held tined implement having hooks associated with selected lines which engage rods of a grill permitting the implement to pivot thereabout causing food engaged by the tines to be turned from one side to the other.

It is therefore one of the objects of the invention to allow those who grill fish and other fragile food products to place those items directly onto a rodded grill surface and to easily free and turn them in a controlled, consistent, foolproof way.

The principle advantage of using the device is then seen to be able to serve a whole grilled fish, a fish filet or any other frangible item in one unbroken piece.

DESCRIPTION OF THE INVENTION

Figure 1:
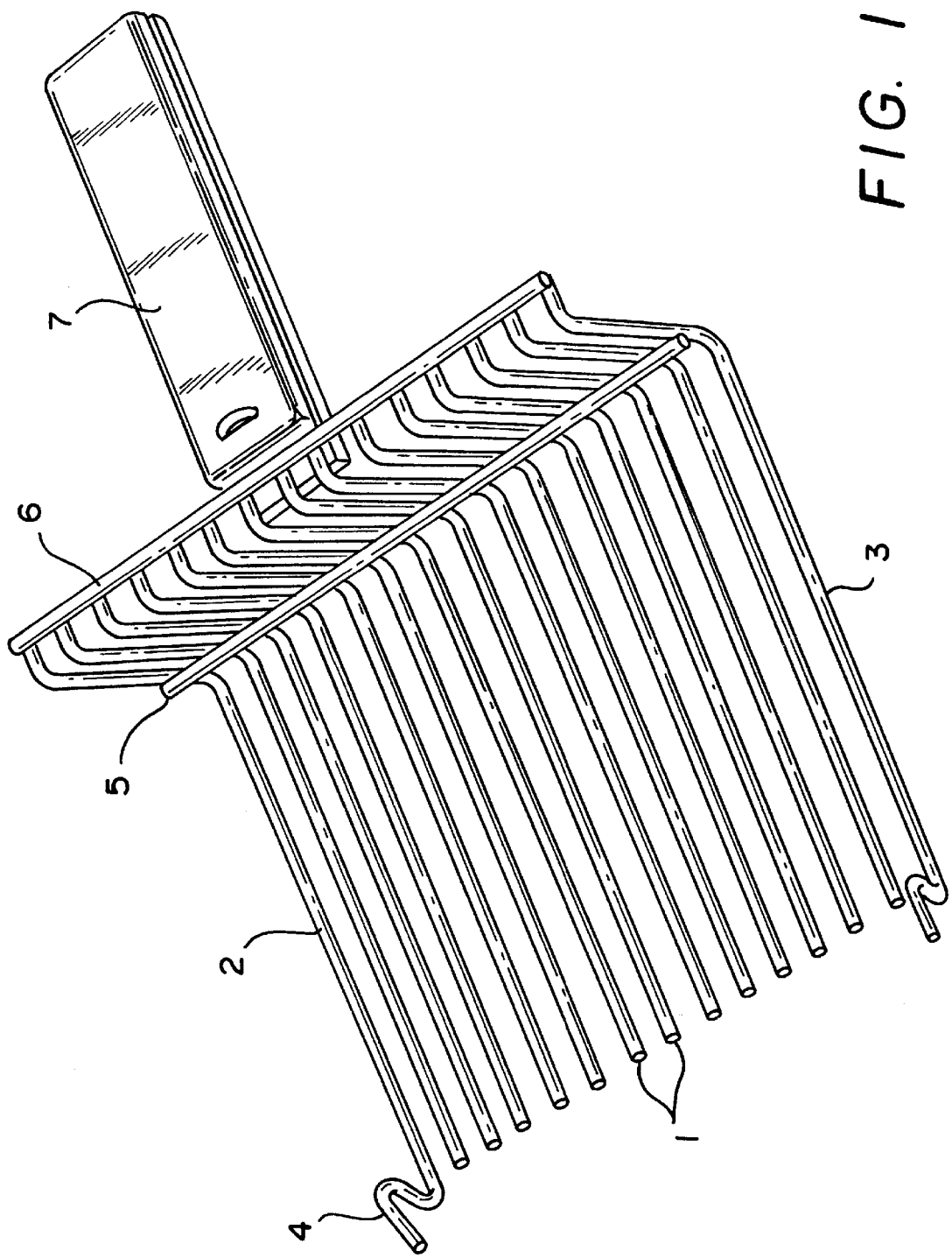
FIG. 1 is a perspective view of the food lifting and turning implement of the present invention.
Figure 3:
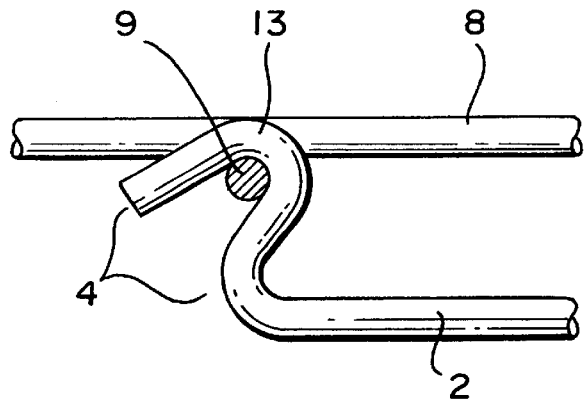
FIG. 3 is an enlarged view showing the details of the relationship of the hook member and a rod of the grill.

With reference to FIG. 1, the implement of the present invention is seen to be comprised of a number of parallel tines 1, 1 with the outermost ones 2, 3 being provided with hook members 4, 4 to be more filly described hereinafter.

A pair of spaced substantially parallel cross members 5, 6 are transversely secured to the tines to add rigidity and diagonal stability to the same while maintaining the spacing therebetween. Cross member 5 also serves to rest on the rods of the grill to keep the tines 1, 1 level and at a uniform distance below the grill rods for using the same. A handle 7 is provided about the extensions of the three innermost tines 1, 1, 1 for facilitating usage of the implement.

Figure 2:
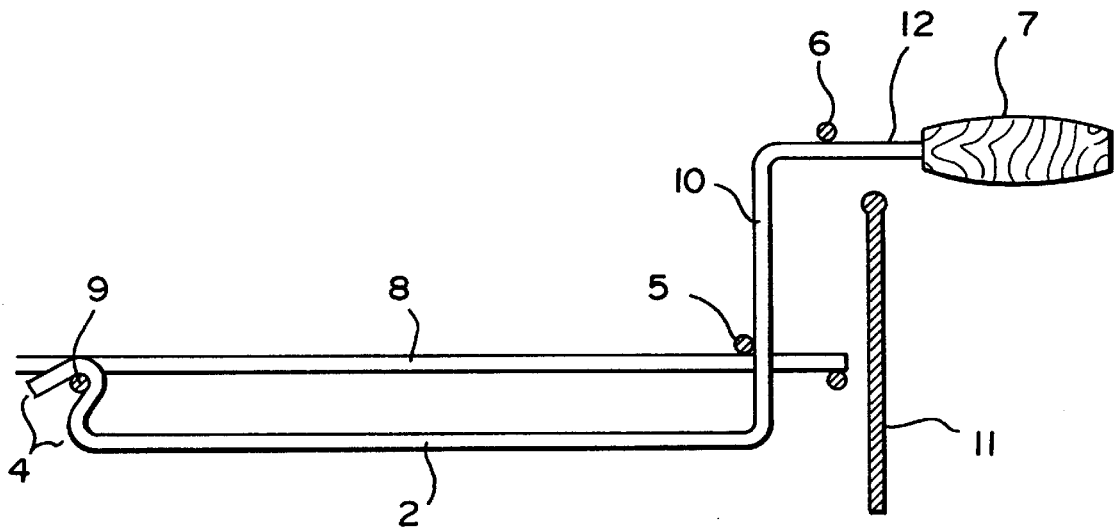
FIG. 2 is a side view of the implement showing one of the hook members engaging a wire of the grill.

The disposition of the implement during use is seen in the side view of FIG. 2 wherein the cross member 5 is seen to be resting on the surface rods 8 (only one being shown) of the grill with the downwardly extending opening of the hook member 4 engaging a transverse rod 9 of the grill.

While in this position, the tines 1, 1 are held beneath the rods 8 of the grill and beneath the article being grilled. It is then only necessary for the user to grasp the handle 7 and rotate the same about the hook members 4, 4 thereby engaging and lifting the article and ultimately tuning the article from one side to the other in its movement from one side of the grill to the other.

With continuing reference to FIG. 2, the implement is seen to have vertical and horizontal portions 10, 12 terminating in the handle 7 which permits its use adjacent the wall 11 of the grill.

I claim:

1. An implement for use in connection with a cooking grill having food supported thereon, said grill including a plurality of spaced wires and a transverse wire maintaining said spaced wires in place, said implement having a handle, a plurality of spaced tines supported by said handle and extending outwardly therefrom, and at least one of said tines being longer than the remaining tines and having a hook member formed with a downwardly extending opening on the end thereof with said hook member engaging said transverse wire for pivotal movement relative thereto whereby said food will be turned from one side to the other.

2. The implement of claim 1 wherein said hook member is formed on an outermost tine.

3. The implement of claim 1 wherein a plurality of tines are formed with hook members thereon.

4. The implement of claim 3 wherein the hook members are formed on the outermost tines.

5. In combination, a cooking grill having a plurality of spaced, generally parallel food-supporting rods and a transverse rod secured to said food supporting rods, and a food-handling implement having a handle, a plurality of parallel spaced tines supported by said handle, a cross-member attached to said tines to maintain the spacing between the tines and positioned to rest on said food-supporting rods to hold said tines below the grill rods, one of said tines being longer than the remaining tines and having a hook member formed on the end thereof, said hook member engaging said transverse rod of the cooking grill to pivot there around, said hook member curving up from the tine and back in the direction of the handle, curving in the opposite direction away from the handle and downwardly toward the tine with the radius of the oppositely directed curve being larger than half the diameter of the transverse rod on which it bears and which it partially surrounds for pivotal movement there around.

* * * * *